(12) United States Patent
Shimizu et al.

(10) Patent No.: US 10,946,728 B2
(45) Date of Patent: Mar. 16, 2021

(54) SUN VISOR CONNECTOR

(71) Applicant: Yazaki Corporation, Tokyo (JP)

(72) Inventors: Tomohiko Shimizu, Shizuoka (JP); Kaname Hatano, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 69 days.

(21) Appl. No.: 16/527,430

(22) Filed: Jul. 31, 2019

(65) Prior Publication Data
US 2020/0039330 A1 Feb. 6, 2020

(30) Foreign Application Priority Data

Aug. 2, 2018 (JP) .............................. JP2018-145714

(51) Int. Cl.
*B60J 3/02* (2006.01)
(52) U.S. Cl.
CPC ........... *B60J 3/0217* (2013.01); *B60J 3/0252* (2013.01)
(58) Field of Classification Search
CPC .............................. B60J 3/0217; B60J 3/0252
USPC ........................................... 296/97.12, 97.13
See application file for complete search history.

(56) References Cited

U.S. PATENT DOCUMENTS

| | | | | |
|---|---|---|---|---|
| 6,270,240 | B1 * | 8/2001 | Inoue ..................... | B60J 3/0217 362/141 |
| 2001/0022336 | A1 * | 9/2001 | Sawayanagi ........... | B60J 3/0217 248/292.12 |
| 2001/0025909 | A1 * | 10/2001 | Sawayanagi ........... | B60J 3/0217 248/292.13 |
| 2002/0166932 | A1 * | 11/2002 | Sawayanagi ........... | B60J 3/0217 248/224.8 |
| 2005/0104409 | A1 | 5/2005 | Garcia | |
| 2011/0260491 | A1 * | 10/2011 | Ebisuoka ............... | B60J 3/0252 296/97.5 |

FOREIGN PATENT DOCUMENTS

| | | |
|---|---|---|
| CN | 101635413 A | 1/2010 |
| JP | 2008-130467 A | 6/2008 |
| JP | 2011-18538 A | 1/2011 |
| JP | 2011-230559 A | 11/2011 |

* cited by examiner

*Primary Examiner* — Joseph D. Pape
(74) *Attorney, Agent, or Firm* — Sughrue Mion, PLLC

(57) ABSTRACT

A sun visor connector includes: a bracket attached to an attachment member; an arm portion rotatably supporting a sun visor main body and having an end inserted through the bracket to be rotatably arranged; a housing fixed to the bracket and arranged in a vicinity of the end of the arm portion inserted through the bracket; a connector terminal accommodated in the housing and connected to a counterpart terminal; an arm connection part provided in an elastically deformable manner on the connector terminal and connected to the end of the arm portion by a biasing force; an engaging portion including a projecting portion provided in the housing and a recessed portion provided in the bracket and engaged with the projecting portion; and a first restricting portion provided in the projecting portion and pressed against and abuts on the recessed portion in a deformation direction of the arm connection part.

4 Claims, 20 Drawing Sheets

SUN VISOR CONNECTOR

CROSS-REFERENCE TO RELATED APPLICATION

The present application is based on, and claims priority from Japanese Patent Application No. 2018-145714, filed on Aug. 2, 2018, the entire contents of which are incorporated herein by reference.

TECHNICAL FIELD

The disclosure relates to a sun visor connector, and more particularly, to a sun visor connector applied to a sun visor rotatably attached to an attachment member.

BACKGROUND

As a sun visor connector according to a conventional example, there has been known one that includes: a bracket attached to a ceiling of a vehicle interior as an attachment member; a support shaft as an arm portion arranged on a vehicle interior side of the bracket, rotatably supports a sun visor main body, and having an end inserted through the bracket so as to be rotatably arranged; a housing fixed to a vehicle interior outer side of the bracket and arranged in the vicinity of the end of the support shaft inserted through the bracket; a pair of connector terminal accommodated in the housing and connected to counterpart terminals arranged on the vehicle interior outer side; and a pair of arm connection parts provided on the pair of connector terminals in an elastically deformable manner and connected by sandwiching the end of the support shaft by a biasing force (see JP 2011-230559 A).

In the known sun visor connector, the pair of connector terminals is accommodated inside the housing, and the pair of arm connection parts is connected so as to sandwich a pair of conductive parts provided at the end of the support shaft.

Then, the sun visor main body is rotated so that a contact state and a non-contact state between the pair of arm connection parts and the pair of conductive parts of the support shaft are switched, and switching on and off of a lighting device provided in the sun visor main body is performed.

SUMMARY

In the known sun visor connector, the housing is fixed to the bracket with a projecting lower region provided in the housing engaged with a recessed engaged portion provided in the bracket.

However, in a fixing structure between the bracket and the housing such as that of the known sun visor connector, there is a gap between the projecting lower region and the recessed engaged portion, and the housing has backlash with respect to the bracket.

Such backlash of the housing affects elastic deformation of each arm connection part of the pair of connector terminals accommodated in the housing, and there has been possibility that connection reliability is lowered by a fluctuation of a contact load between the end of the arm portion and each of the arm connection parts, generation of resistance increase, and the like.

In view of the above, an object of the present application is to provide a sun visor connector by which connection reliability can be maintained.

A sun visor connector according to an aspect of the present application includes: a bracket attached to an attachment member; an arm portion arranged on a side of one surface of the attachment member of the bracket, configured to rotatably support a sun visor main body, and having an end inserted through the bracket so as to be rotatably arranged; a housing fixed to a side of other surface of the attachment member of the bracket and arranged in the vicinity of the end of the arm portion inserted through the bracket; a connector terminal accommodated in the housing and connected to a counterpart terminal arranged on the other surface of the attachment member; an arm connection part provided on the connector terminal in an elastically deformable manner and connected to the end of the arm portion by a biasing force; an engaging portion including a projecting portion provided in either one of the bracket and the housing and a recessed portion provided in the other one of the bracket and the housing and engaged with the projecting portion; and a first restricting portion provided in either one of the projecting portion and the recessed portion and pressed against and abuts on the other one of the projecting portion and the recessed portion in a deformation direction of the arm connection part.

In such a sun visor connector, either one of the projecting portion and the recessed portion is provided with the first restricting portion which is pressed against and abuts on the other one of the projecting portion and the recessed portion in the deformation direction of the arm connection part. Accordingly, in a state where the housing is assembled to the bracket, backlash of the housing in the deformation direction of the arm connection part can be prevented.

For this reason, the arm connection part of the connector terminal accommodated in the housing does not come in contact with the end of the arm portion while being fluctuated in the deformation direction due to backlash of the housing, and generation of a fluctuation in a contact load between the end of the arm portion and the arm connection part can be prevented.

Therefore, in such a sun visor connector, the connection load between the end of the arm and the arm connection part is not fluctuated due to backlash of the housing, and connection reliability can be maintained.

The first restricting portion may press the housing in a biasing direction of the arm connection part.

As the housing is pressed in the biasing direction of the arm connection part by the first restricting portion, the housing does not have backlash in a direction in which the arm connection part is separated from the end of the arm portion, and a contact load between the end of the arm portion and the arm connection part can be maintained.

A fulcrum portion serving as a fulcrum when the housing is rotated and assembled to the bracket may be provided between the bracket and the housing, and the projecting portion may be provided with an insertion guide portion which is inclined along a rotation track of the housing and guides the insertion of the projecting portion into the recessed portion.

In such a sun visor connector, the projecting portion is provided with the insertion guide portion which is inclined along the rotation track of the housing and guides the insertion of the projecting portion into the recessed portion. Therefore, when the housing is assembled to the bracket, the projecting portion can be smoothly inserted into the recessed portion, and the assemblability can be improved.

Either one of the projecting portion and the recessed portion may be provided with a second restricting portion which is pressed against and abuts on the other one of the projecting portion and the recessed portion in a direction orthogonal to the deformation direction of the arm connection part.

In such a sun visor connector, either one of the projecting portion and the recessed portion is provided with the second restricting portion which is pressed against and abuts on the other one of the projecting portion and the recessed portion in a direction orthogonal to the deformation direction of the arm connection part. Therefore, the housing does not have backlash in the direction orthogonal to the deformation direction of the arm connection part, and the contact load between the end of the arm portion and the arm connection part can be further maintained.

According to the aspect of the present application, an advantageous effect in which the sun visor connector capable of maintaining connection reliability can be provided is achieved.

DETAILED DESCRIPTION

Figure 1:
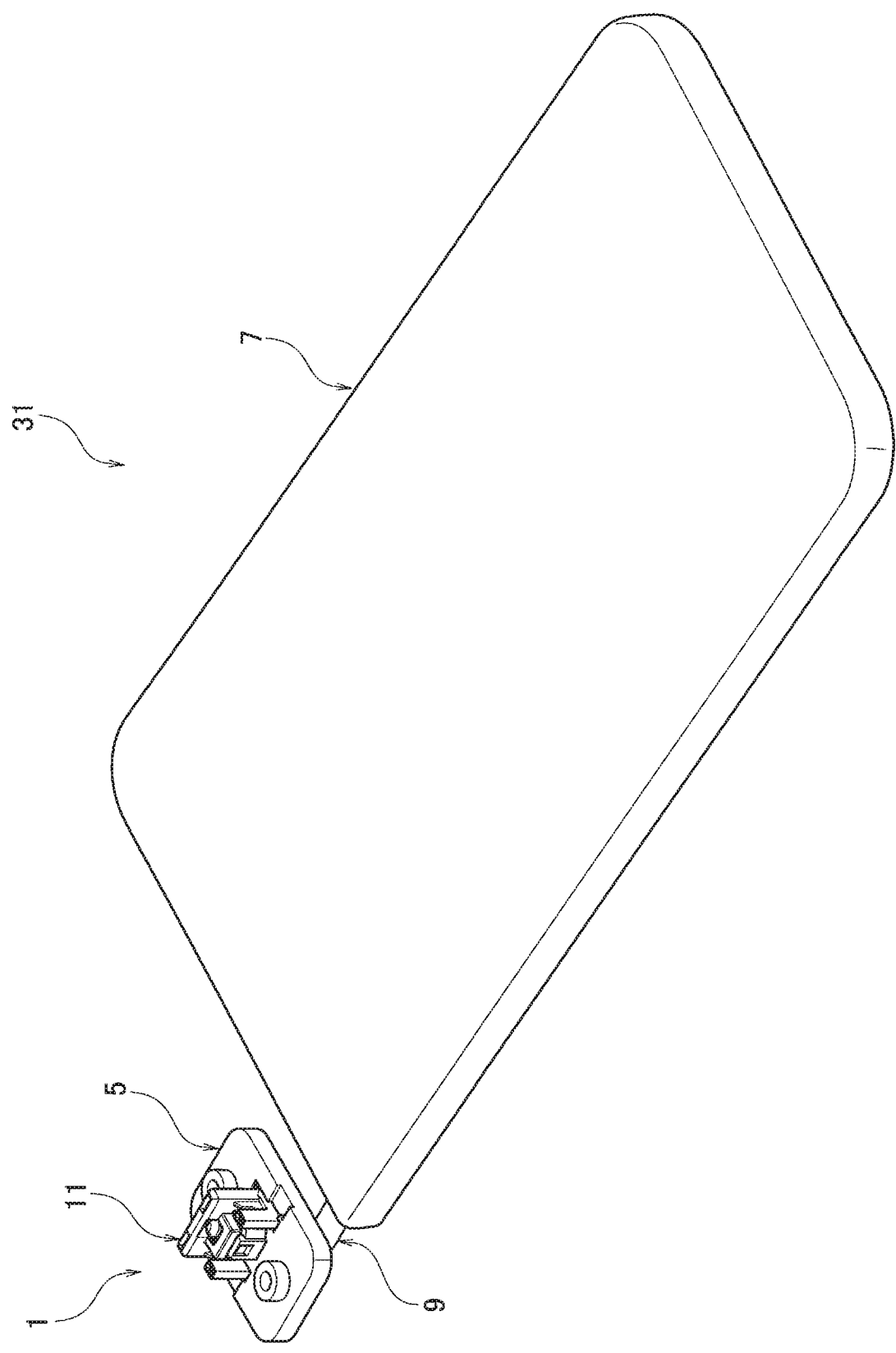
FIG. 1 is a perspective view of a sun visor to which a sun visor connector according to an embodiment is applied.
Figure 2:
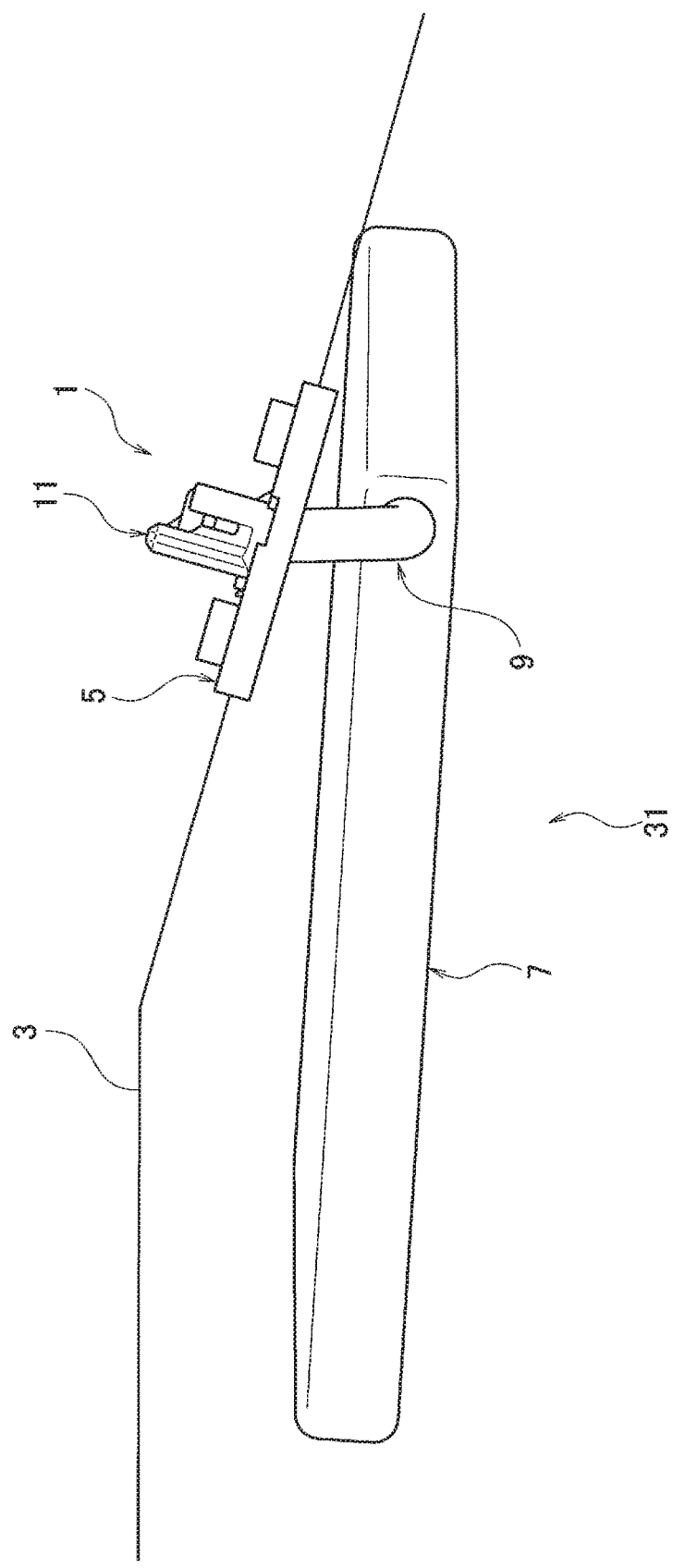
FIG. 2 is a side view when the sun visor to which the sun visor connector according to the embodiment is applied is attached to an attachment member.
Figure 3:
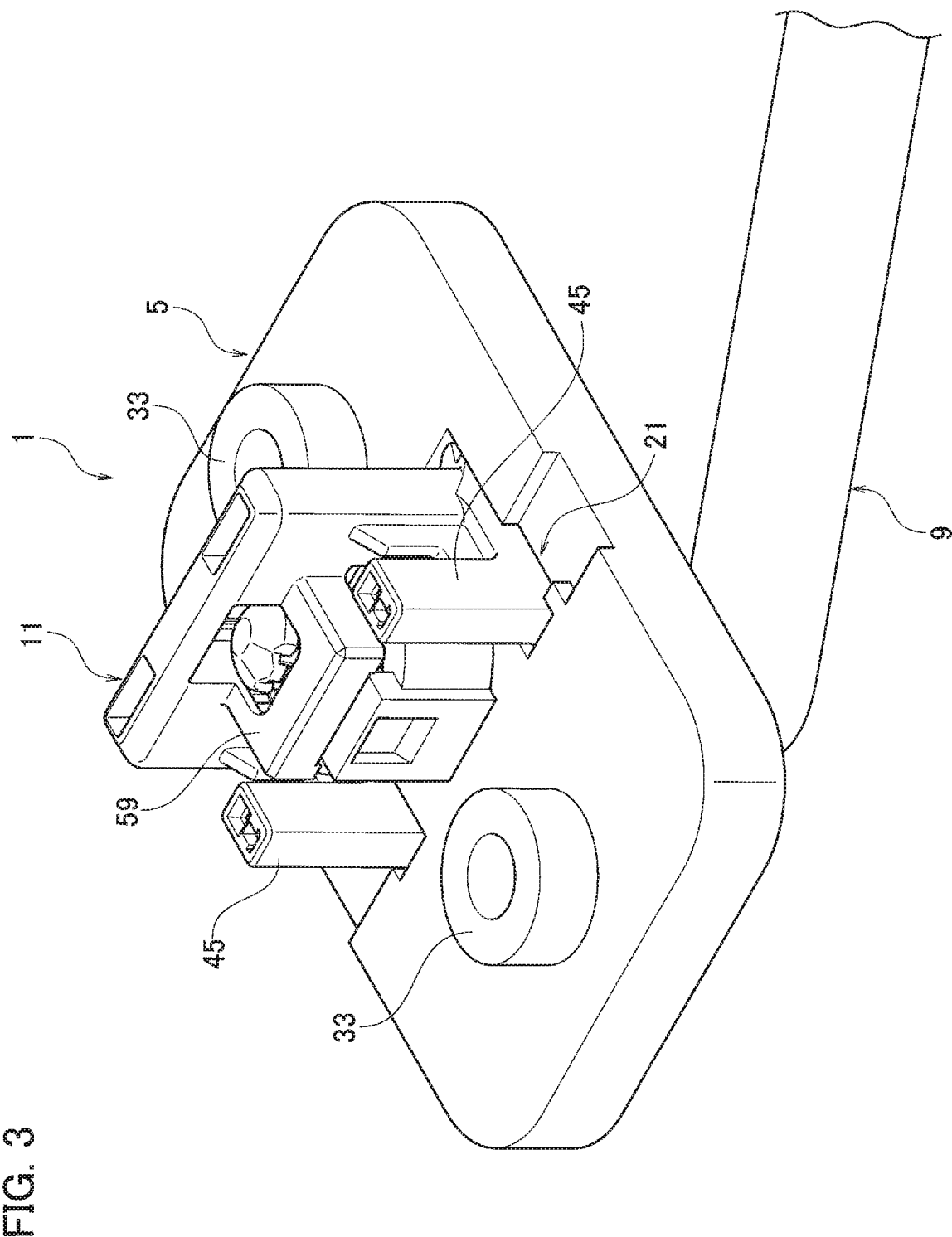
FIG. 3 is a perspective view of the sun visor connector according to the embodiment.
Figure 4:
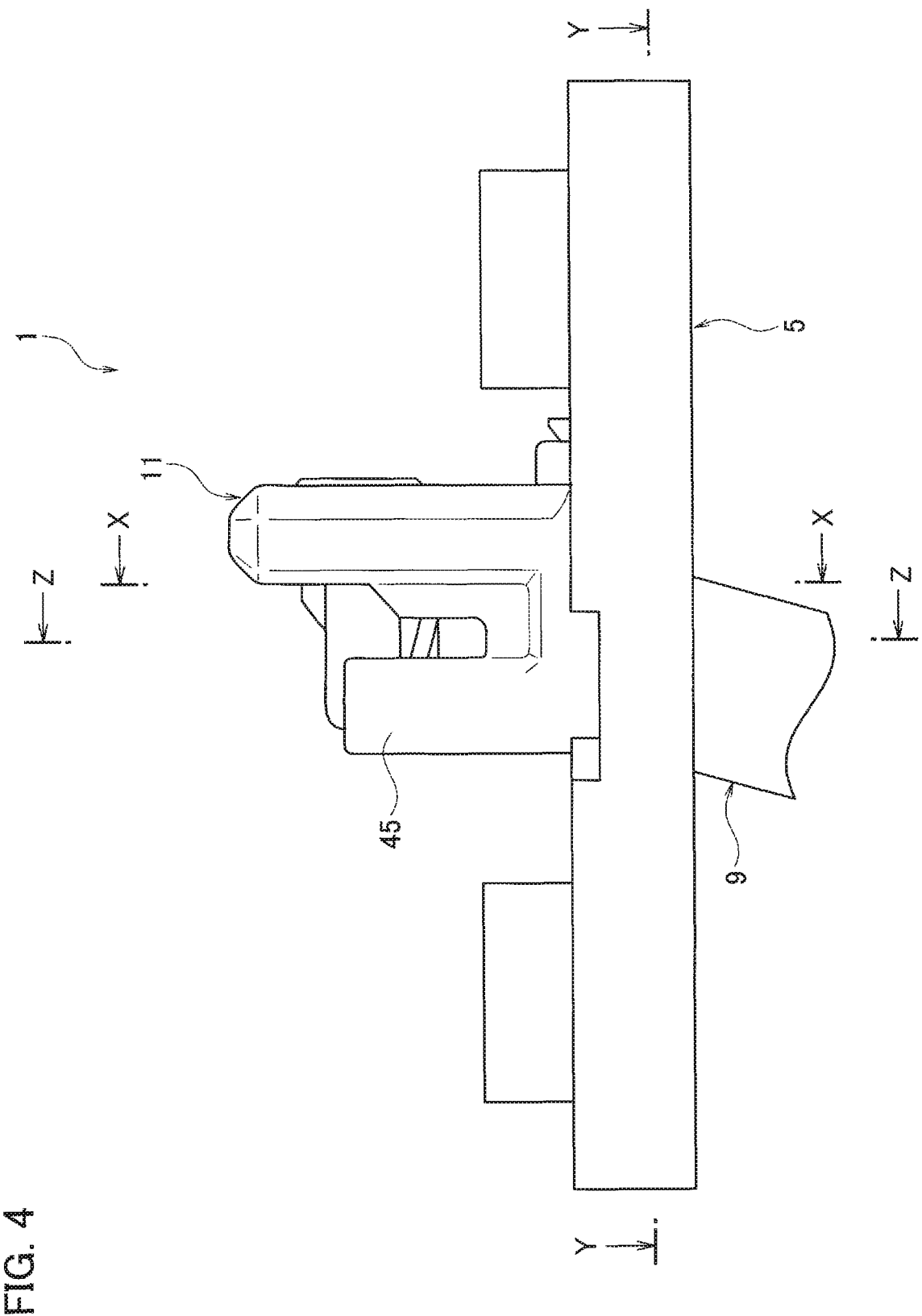
FIG. 4 is a side view of the sun visor connector according to the embodiment.

A sun visor connector according to an embodiment will be described with reference to FIGS. 1 to 20.

A sun visor connector 1 according to the embodiment includes: a bracket 5 attached to an attachment member (a ceiling of a vehicle interior) 3; an arm portion 9 that is arranged on one surface side (hereinafter referred to as the "vehicle interior side") of the attachment member 3 of the bracket 5, rotatably supports a sun visor main body 7, and has an end inserted through the bracket 5 so as to be rotatably arranged; a housing 11 that is fixed to the other surface side (hereinafter referred to as the "vehicle interior outer side") of the attachment member 3 of the bracket 5 and arranged in the vicinity of the end of the arm portion 9 inserted through the bracket 5; a pair of connector terminals 13 that is accommodated in the housing 11 and connected to counterpart terminals (not illustrated) arranged on the vehicle interior outer side; and a pair of arm connection parts 15 that is provided on the pair of connector terminals 13 in an elastically deformable manner and connected to the end of the arm portion 9 by a biasing force.

An engaging portion 21, in which a pair of projecting portions 17 provided on the housing 11 is inserted into and engaged with a pair of recessed portions 19 provided on the bracket 5, is provided between the bracket 5 and the housing 11.

Each of the projecting portions 17 is provided with a first restricting portion 23 which is pressed against and abuts on a corresponding recessed portion 19 in a deformation direction of a corresponding arm connection part 15.

Each of the first restricting portions 23 presses the housing 11 in a biasing direction of the corresponding arm connection part 15.

Between the bracket 5 and the housing 11, a fulcrum portion 25 is provided as a fulcrum when the housing 11 is rotated and assembled to the bracket 5.

Each of the projecting portions 17 is provided with an insertion guide portion 27 which is inclined along a rotation track of the housing 11 and guides insertion of the corresponding projecting portion 17 into the corresponding recessed portion 19.

Each of the recessed portions 19 is provided with a second restricting portion 29 which is pressed against and abuts on the corresponding projecting portion 17 in a direction orthogonal to the deformation direction of the corresponding arm connection part 15.

As illustrated in FIGS. 1 to 20, the sun visor connector 1 is applied to a sun visor 31 attached to a ceiling of a vehicle interior as the attachment member 3.

The sun visor 31 includes a sun visor main body 7 and the sun visor connector 1.

The sun visor main body 7 is formed in a rectangular shape and arranged on the vehicle interior side of the ceiling as the attachment member 3, has a mirror (not illustrated) and a lamp (not illustrated) for illuminating the mirror arranged on a surface, and accommodates a lighting device (not illustrated) for switching on and off a lamp in the inside.

The sun visor main body 7 is arranged with the arm portion 9 that is inserted through a long side portion of the sun visor main body 7 and exposed from an end portion of the sun visor main body 7 toward the ceiling (attachment member 3). A power supply (not illustrated) for supplying power arranged on the vehicle interior outer side of the ceiling (attachment member 3) and the lighting device (not illustrated) accommodated in the sun visor main body 7 are electrically connected via the sun visor connector 1.

The sun visor connector 1 includes the bracket 5, the arm portion 9, the housing 11, and the pair of connector terminals 13.

The bracket 5 is formed in a rectangular plate shape, and is fixed to the attachment member 3 by a fixing member (not illustrated), such as bolts, at attaching portions 33 provided on both sides in a longitudinal direction of the bracket 5.

In a center portion of the bracket 5, a cylindrically-formed support portion 35, through which the end of the arm portion 9 is inserted, is provided for rotatably supporting the arm portion 9.

Figure 16:
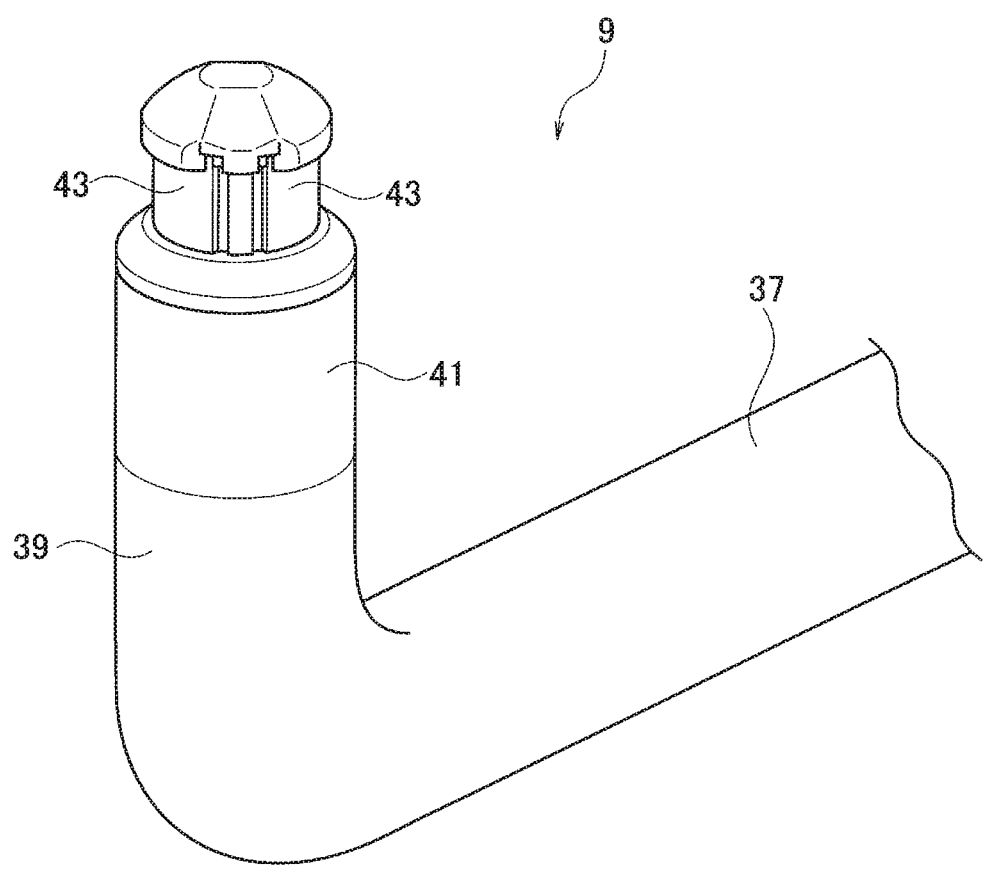
FIG. 16 is a perspective view of an arm portion of the sun visor connector according to the embodiment.
Figure 17:
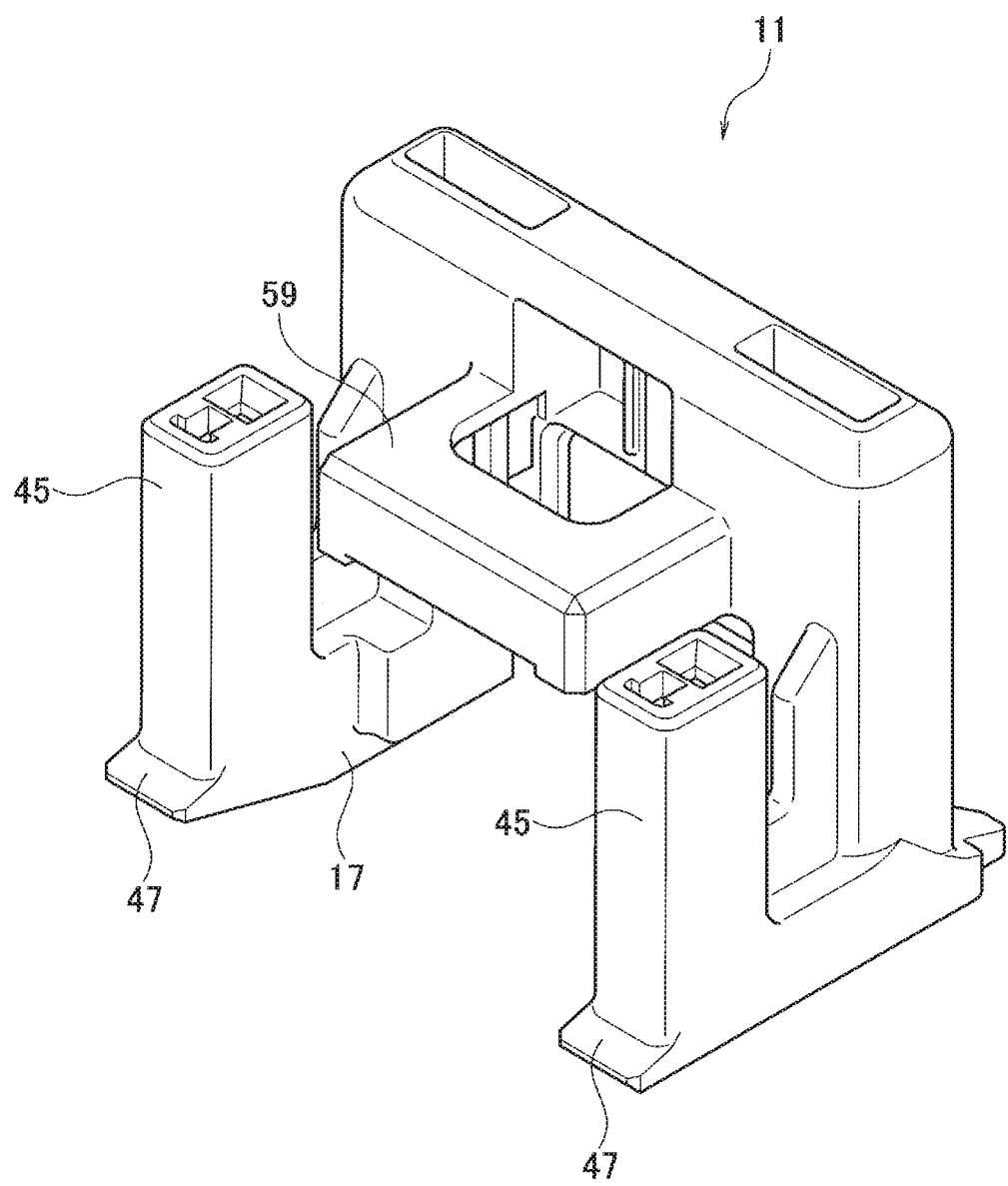
FIG. 17 is a perspective view of the housing of the sun visor connector according to the embodiment.
Figure 18:
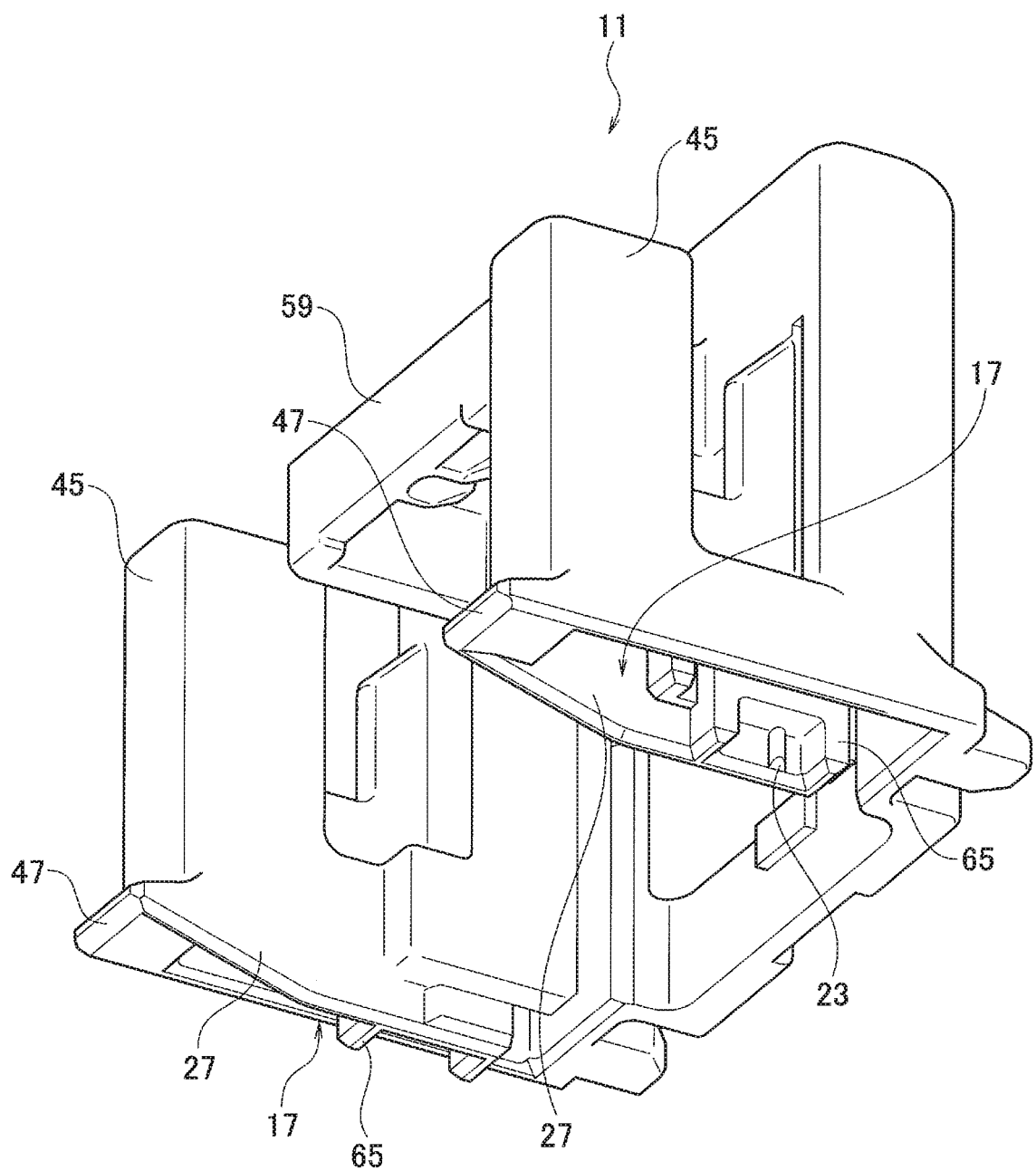
FIG. 18 is a perspective view of the housing of the sun visor connector according to the embodiment.
Figure 19:
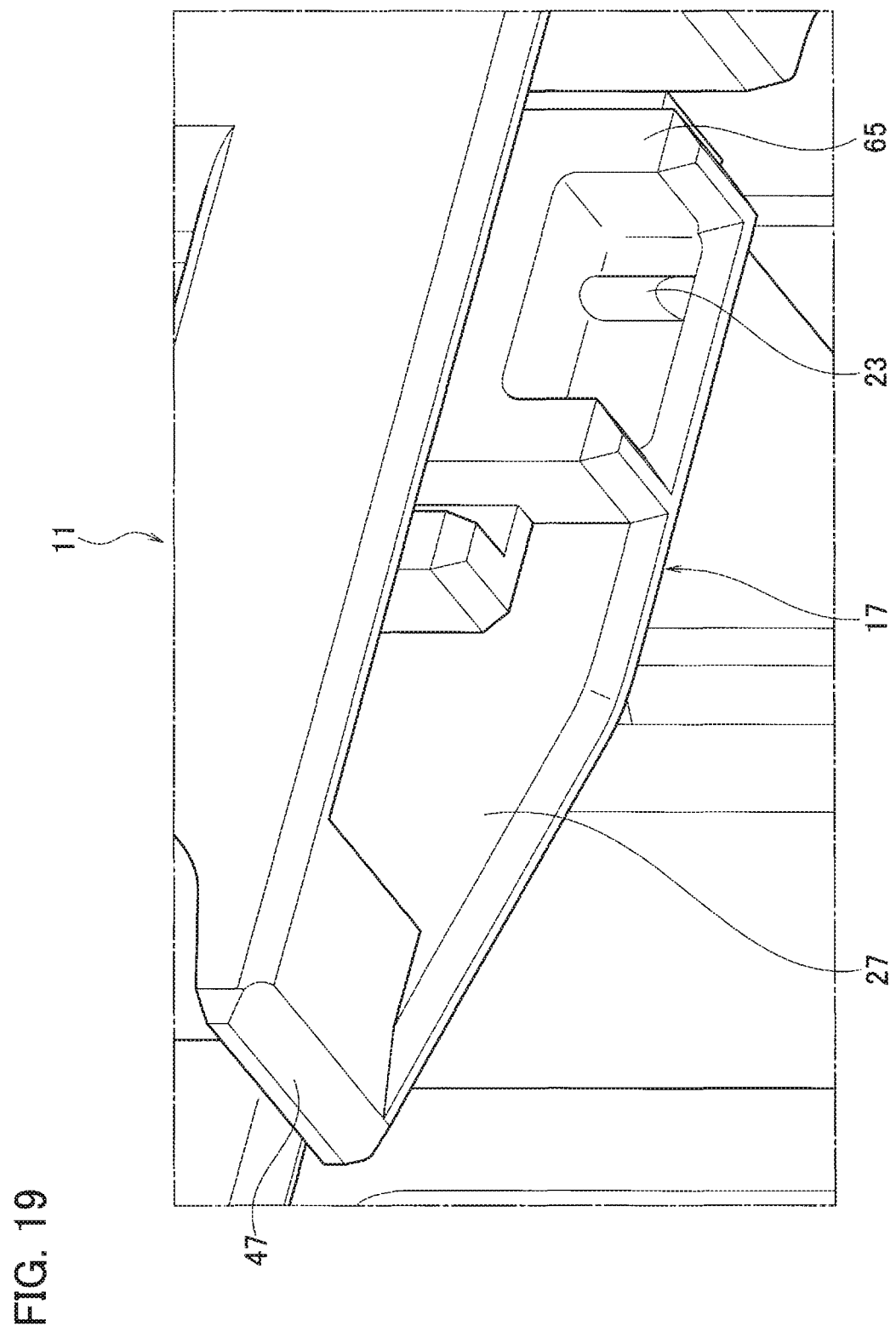
FIG. 19 is an enlarged view of an essential part of FIG. 18.
Figure 20:
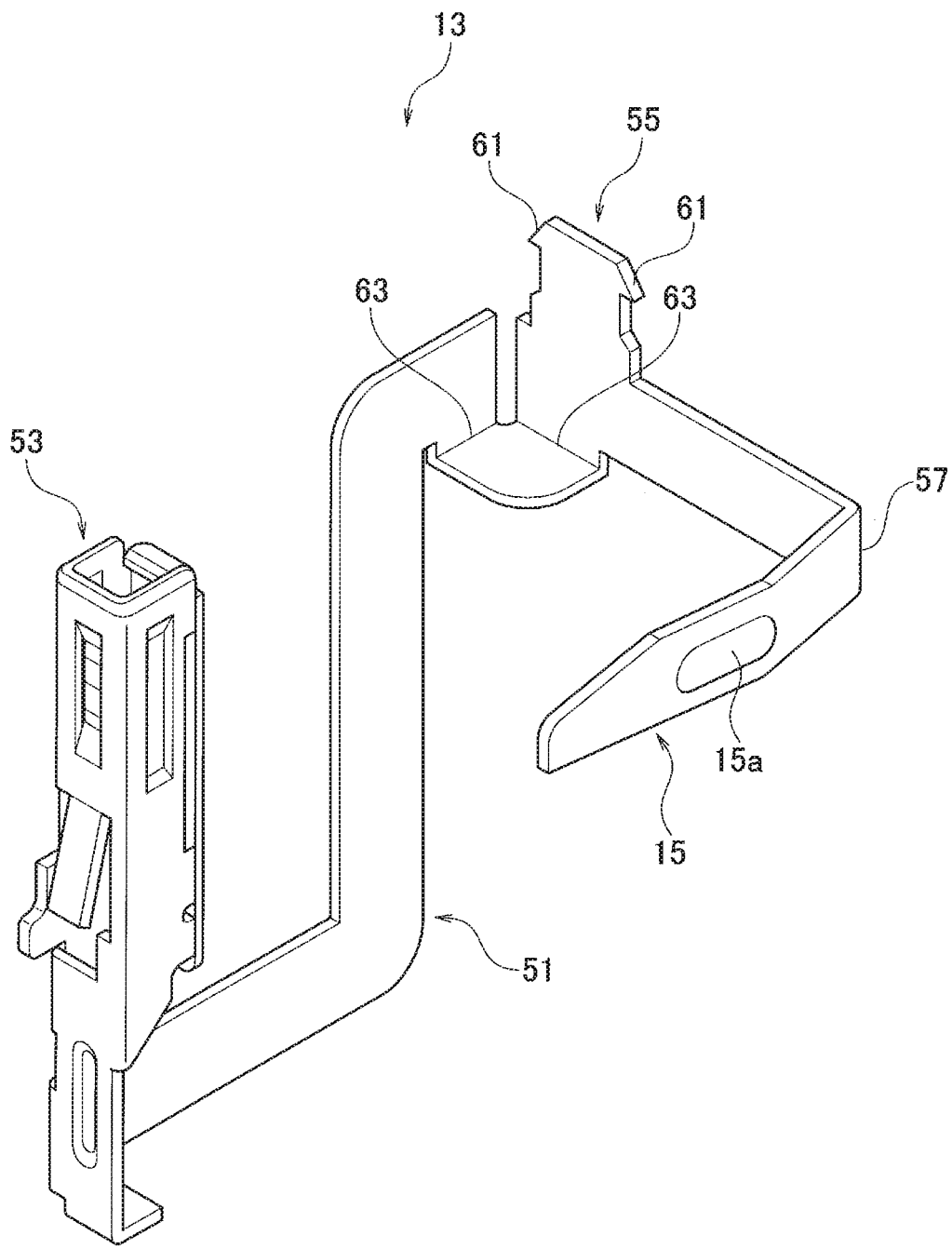
FIG. 20 is a perspective view of a connector terminal of the sun visor connector according to the embodiment.

In the inside of the arm portion 9, two conductors (not illustrated) electrically connected to the lighting device (not illustrated) accommodated in the sun visor main body 7 are insert-molded. The arm portion 9 includes a long shaft portion 37 and a short shaft portion 39 as illustrated in FIG. 16.

The long shaft portion 37 is inserted through the inside in the vicinity of the long side portion of the sun visor main body 7, and rotatably supports the sun visor main body 7 between a housing position (a position at which the sun visor main body 7 is rotated toward the attachment member 3) and a light shielding position (a position at which the sun visor main body 7 is rotated toward a windshield or side glass) around the axis of the long shaft portion 37.

At an end of the long shaft portion 37 located inside the sun visor main body 7, a pair of contact portions (not illustrated) on which two conductors insert-molded in the arm portion 9 are exposed is provided. The pair of contact portions (not illustrated) is provided so as to be able to be in contact with a pair of terminals (not illustrated) provided on the lighting device (not illustrated).

For example, the pair of contact portions (not illustrated) and the pair of terminals (not illustrated) are not in contact at the housing position of the sun visor main body 7 so that the lamp is switched off, and are in contact at the light shielding position of the sun visor main body 7 so that the lamp is switched on.

At the end of the long shaft portion 37 exposed to the outside of the sun visor main body 7, the short shaft portion 39 is provided as a single continuous member.

The short shaft portion 39 is provided to extend toward the attachment member 3 from the end of the long shaft portion 37 exposed from the sun visor main body 7 in such a manner that the arm portion 9 is formed in an L shape.

On the attachment member 3 side of the short shaft portion 39, a rotary portion 41 that is rotatable about an axis of the short shaft portion 39 is provided. The arm portion 9 is supported by the bracket 5 so as to be rotatable about the axis of the short shaft portion 39 as the rotary portion 41 is inserted through the support portion 35 of the bracket 5, and press-fitted and fixed.

With the short shaft portion 39 supported by the bracket 5 in this manner, the sun visor main body 7 is rotatable between a front position (a position at which the sun visor main body 7 moves to the windshield) and a side position (a position at which the sun visor main body 7 moves to the side glass) around the axis of the short shaft portion 39.

As illustrated in FIG. 16, at the end of the short shaft portion 39 that is inserted through the bracket 5, a pair of contact portions 43 in which two conductors (not illustrated) insert-molded in the inside of the arm portion 9 are exposed is provided.

The housing 11 is arranged so as to cover the pair of contact portions 43 on the bracket 5 in which the pair of contact portions 43 is arranged.

The housing 11 is made from an insulating material, such as synthetic resin. The housing 11 is provided with a pair of fitting portions 45 which is arranged on the vehicle interior outer side of the attachment member 3. To the pair of fitting portions 45, a counterpart housing (not illustrated) connected to the power supply for supplying power is fitted.

The housing 11 is arranged to cover the support portion 35 of the bracket 5. The housing 11 is fixed to the bracket 5 with the engaging portion 21 interposed between the housing 11 and the bracket 5.

The engaging portion 21 includes the pair of projecting portions 17 extend toward the bracket 5 from a surface facing the bracket 5 on which the pair of fitting portions 45 of the housing 11 is positioned, and the pair of recessed portions 19 provided on both sides of the support portion 35 of the bracket 5 in such a manner that the pair of projecting portions 17 can be inserted.

On one end side of the pair of engaging portions 21, there is provided the fulcrum portion 25 including a pair of fulcrum projecting portions 47 protruding outward from a side surface of the housing 11 on one end side of the pair of projecting portions 17 and a pair of fulcrum recessed portions 49 provided so as to be able to accommodate the pair of fulcrum projecting portions 47 by leaving an upper surface of the bracket 5 on one end side of the pair of recessed portions 19.

When the housing 11 is assembled to the bracket 5, the pair of fulcrum projecting portions 47 and the pair of fulcrum recessed portions 49 are engaged, and the fulcrum portion 25 becomes fulcrums for rotating the housing 11 with respect to the bracket 5.

By rotating the housing 11 with respect to the bracket 5 by using the fulcrum portion 25, the pair of projecting portions 17 is inserted into and engaged with the pair of recessed portions 19 at the engaging portion 21, and the housing 11 is fixed to the bracket 5.

The pair of connector terminals 13 is accommodated in the inside of the housing 11, and the counterpart housing is fitted to the pair of fitting portions 45. In this manner, supplying power to the lighting device accommodated in the inside of the sun visor main body 7 can be performed via the arm portion 9.

Each of the connector terminals 13 includes a main body portion 51, a counterpart connection portion 53, the arm connection part 15, and a fixing portion 55.

Since the pair of connector terminals 13 is formed symmetrically each other, thus one of the connector terminals 13 will be described below, and description of the other one of the connector terminals 13 will be omitted.

The main body portion 51 is made from a conductive material, formed in a flat plate shape, and bent. In this manner, the counterpart connection portion 53 is provided on one end side of the main body portion 51, and the arm connection part 15 is provided on the other end side of the main body portion 51.

The counterpart connection portion 53 is formed in a box shape in which an elastically deformable elastic piece having a contact point in the inside is arranged by being bent to one end side of the main body portion 51.

The counterpart connection portion 53 is arranged in the fitting portion 45 in a state of being accommodated in the housing 11. When a counterpart housing is fitted to the fitting portion 45, the counterpart connection portion 53 becomes in contact with a counterpart terminal (not illustrated) accommodated in the counterpart housing, and the connector terminal 13 and the counterpart terminal are electrically connected.

The arm connection part 15 is provided so as to be elastically deformable at a bending portion 57 by being bent to the other end side of the main body portion 51. The arm connection part 15 is provided with a contact 15a that protrudes toward the contact portion 43 of the arm portion 9.

The arm connection part 15 of one of the connector terminals 13 is arranged to face the arm connection part 15 of the other one of the connector terminals 13 with the pair of contact portions 43 (an end of the short shaft portion 39) sandwiched between them in a protective portion 59 that is provided in the housing 11 and exposed to the pair of contact portions 43 of the arm portion 9 in a state of being accommodated in the housing 11.

The pair of arm connection parts 15 sandwiches the pair the contact portions 43 by a biasing force of the pair of arm connection parts 15, and the pair of connector terminals 13 and the pair the contact portions 43 are electrically connected.

The arm portion 9 is rotatable about the axis of the short shaft portion 39 with respect to the bracket 5, so that the sun visor main body 7 is rotatable between the front position and the side position.

For such a movement of the sun visor main body 7, the pair of arm connection parts 15 and the pair of contact portions 43 are, for example, in contact at the front position of the sun visor main body 7 to switch on the lamp, and not in contact at the side portion of the sun visor main body 7 to switch off the lamp.

The fixing portion 55 for fixing the connector terminal 13 to the housing 11 is provided in the main body portion 51 positioned between the arm connection part 15 and the counterpart connection portion 53.

The fixing portion 55 protrudes from a side surface positioned between the counterpart connection portion 53 of the main body portion 51 and the arm connection part 15 toward an inner wall surface of the housing 11.

The fixing portion 55 is provided with a pair of press-fit portions 61 protruding outward in an inclined shape on both sides in a width direction.

The pair of press-fit portions 61 fixes the connector terminal 13 to the housing 11 by being press-fitted to a press-fitted portion (not illustrated) provided inside the housing 11.

The fixing portion 55 is press-fitted to the press-fitted portion of the housing 11 in a state before the housing 11 is assembled to the bracket 5, and fixes the connector terminal 13 to the housing 11 in advance.

The main body portion 51 positioned between the fixing portion 55 and the counterpart connection portion 53 is provided with a bent portion 63 that is bent in a plane direction orthogonal to a fitting direction between the counterpart terminal and the counterpart connection portion 53, and a plane direction parallel to the fitting direction between the counterpart terminal and the counterpart connection portion 53.

The bent portion 63 attenuates vibration generated on the counterpart connection portion 53 side, such as free movement generated between the counterpart connection portion 53 and the counterpart terminal, and suppresses occurrence of contact failure on the arm connection part 15 side.

In addition, by providing the bent portion 63, the counterpart connection portion 53 and the arm connection part 15 can be arranged close to each other, and the housing 11 that accommodates the connector terminal 13 can be reduced in size.

As the connector terminal 13 is fixed to the housing 11 by the fixing portion 55, if a gap is formed in the engaging portion 21 between the bracket 5 and the housing 11, backlash occurs in the housing 11, and this backlash is transmitted to the connector terminal 13.

When the backlash of the housing 11 is transmitted to the connector terminal 13, a contact load of the arm connection part 15 in contact with the contact portion 43 of the arm portion 9 fluctuates due to elastic deformation, which may cause resistance increase, and the like.

In particular, if backlash occurs in the housing 11 in the deformation direction of the arm connection part 15, the arm connection part 15 has backlash in the deformation direction, and the contact load of the arm portion 9 with respect to the contact portion 43 easily fluctuates.

In view of the above, the first restricting portion 23 and the second restricting portion 29 are provided in the projecting portion 17 and the recessed portion 19 which constitute the engaging portion 21.

The first restricting portion 23 is a rib that is provided at a bottom of a projecting side frame portion 65 protruding toward an inner wall surface of the recessed portion 19 in the projecting portion 17, and protrudes from the bottom of the projecting side frame portion 65 toward the inner wall surface of the recessed portion 19 and extends toward a height direction of the projecting portion 17.

The protruding direction of the first restricting portion 23 is the same as the deformation direction of the arm connection part 15 (here, the width direction of the bracket 5).

The first restricting portion 23 abuts so as to press the inner wall surface of the recessed portion 19 opposed in the protruding direction so as to eliminate the backlash between the projecting portion 17 and the recessed portion 19 in the engaging portion 21 in the deformation direction of the arm connection part 15.

With the first restricting portion 23 eliminating the backlash between the projecting portion 17 and the recessed portion 19 in the deformation direction of the arm connection part 15, the housing 11 has no backlash with respect to the bracket 5 in the deformation direction of the arm connection part 15 (here, the width direction of the bracket 5).

Therefore, the arm connection part 15 of the connector terminal 13 fixed to the housing 11 has no backlash in the deformation direction, and a fluctuation of the contact load on the contact portion 43 of the arm portion 9 is suppressed, and resistance increase and the like can be suppressed.

The protruding direction of the first restricting portion 23 is opposite to the biasing direction of the arm connection part 15 (here, to an outer side in the width direction of the bracket 5) in the deformation direction of the arm connection part 15.

Figure 5:
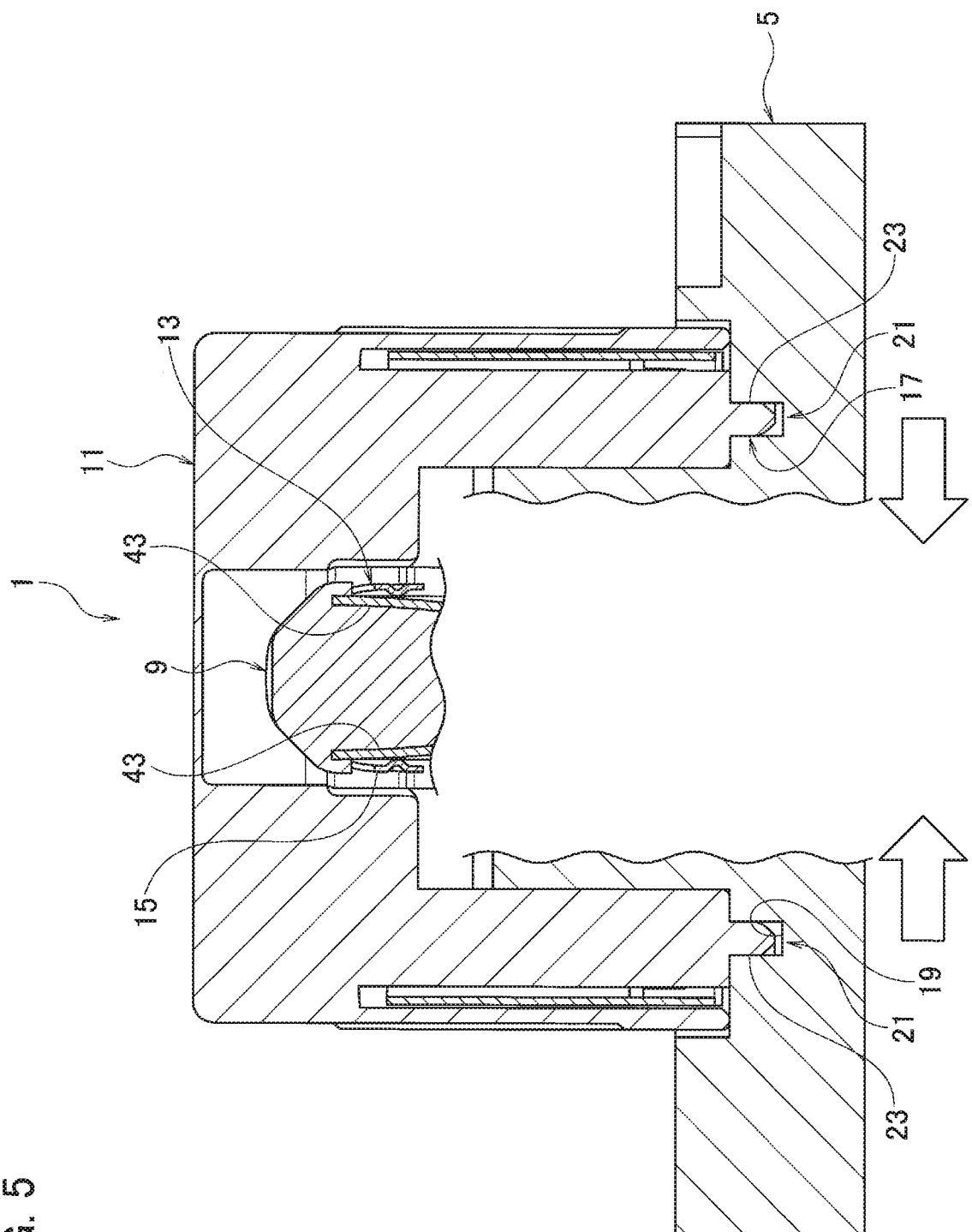
FIG. 5 is a cross-sectional view taken along line X-X of FIG. 4.
Figure 6:
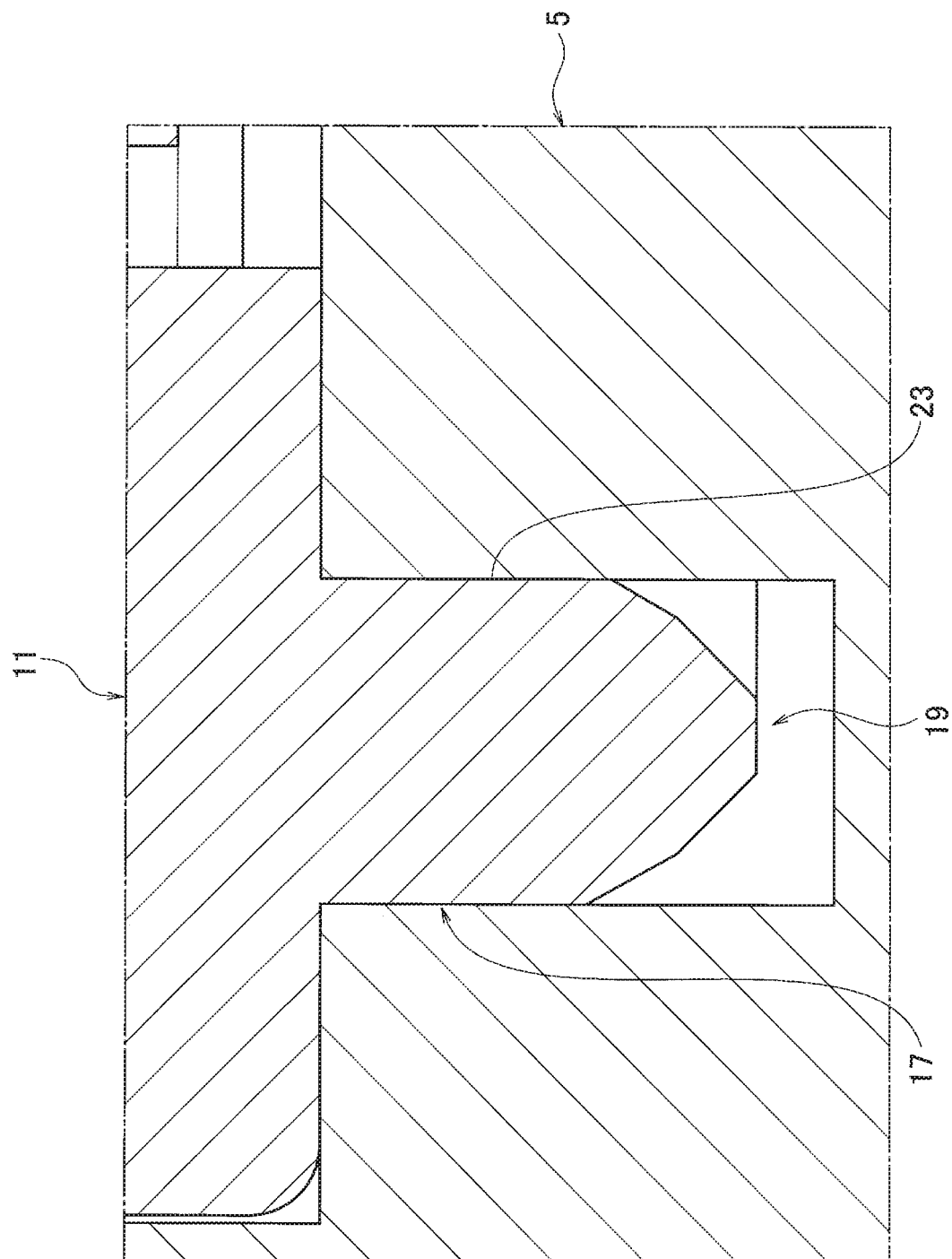
FIG. 6 is an enlarged view of an essential part of FIG. 5.
Figure 7:
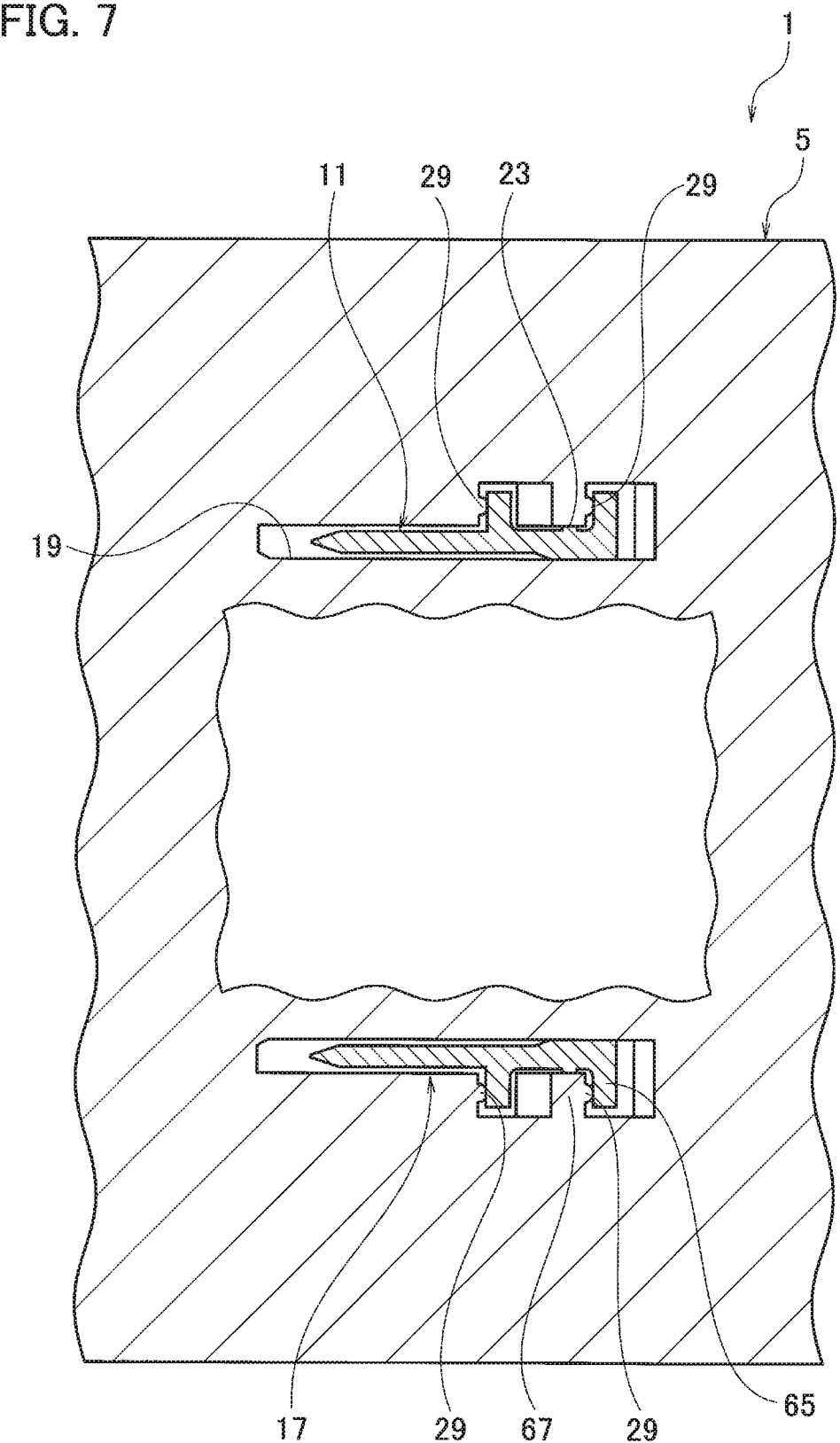
FIG. 7 is a cross-sectional view taken along line Y-Y of FIG. 4.
Figure 8:
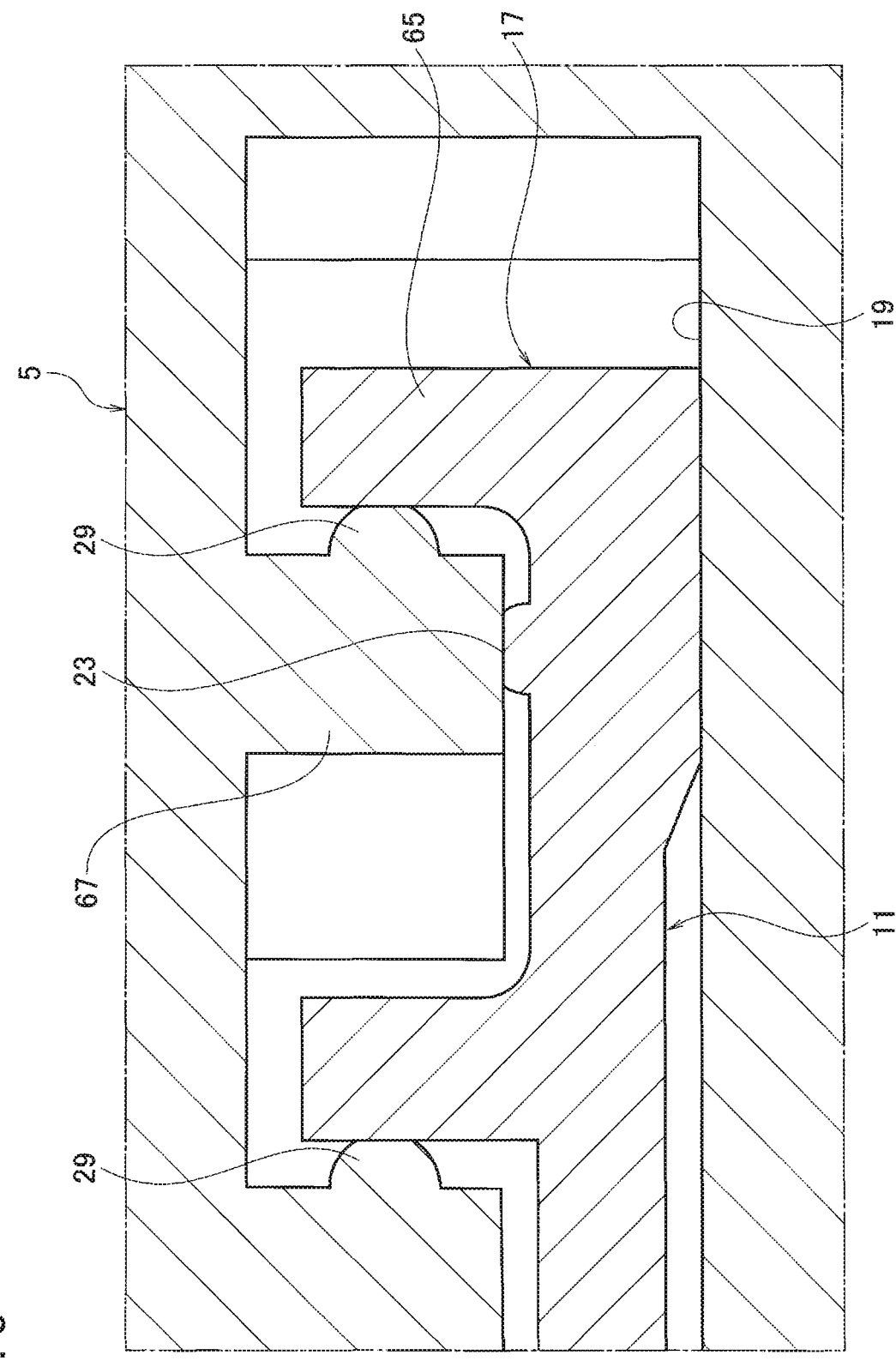
FIG. 8 is an enlarged view of an essential part of FIG. 7.
Figure 9:
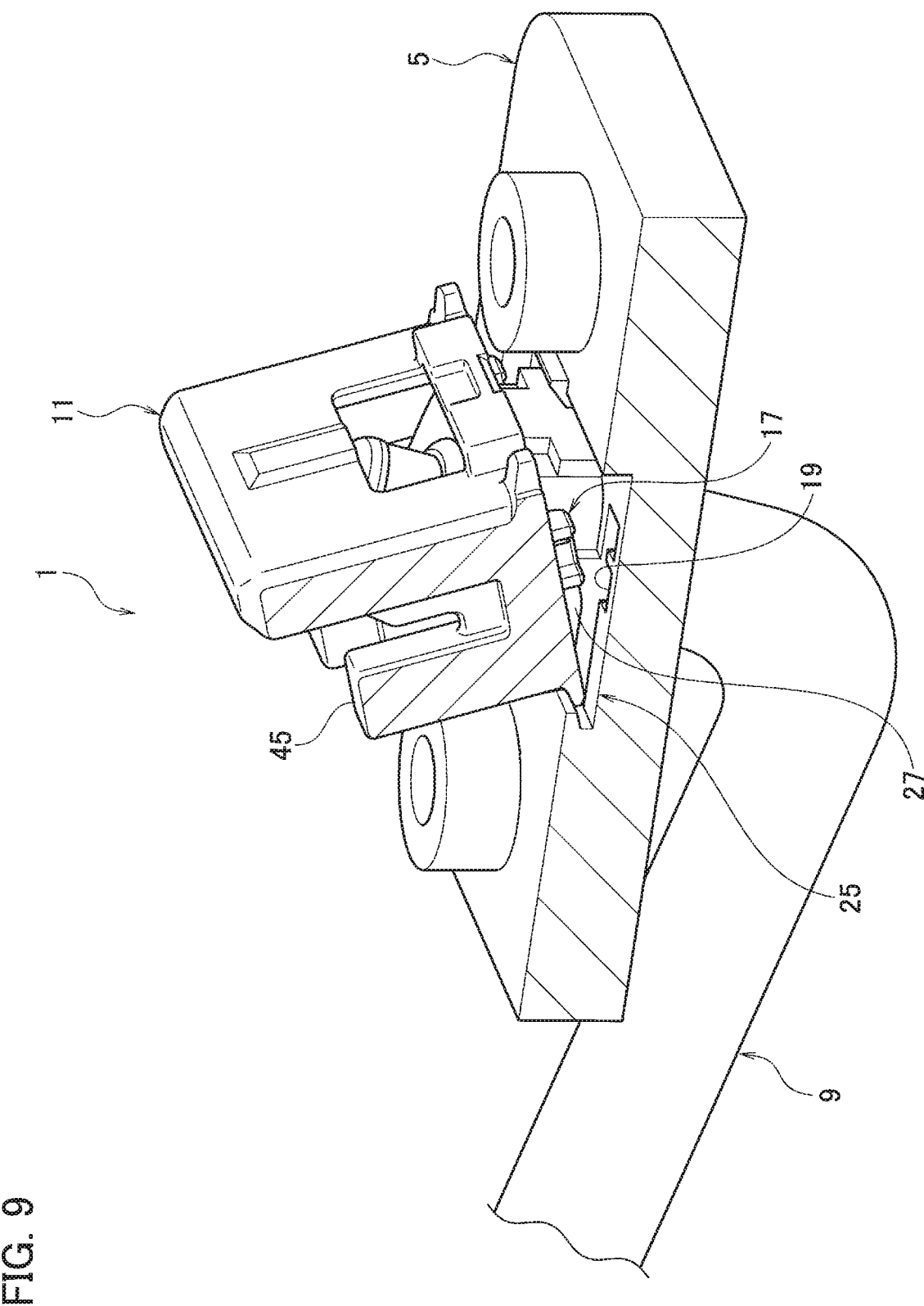
FIG. 9 is a partially cross-sectional perspective view of the sun visor connector according to the embodiment when a housing is assembled to a bracket.
Figure 10:
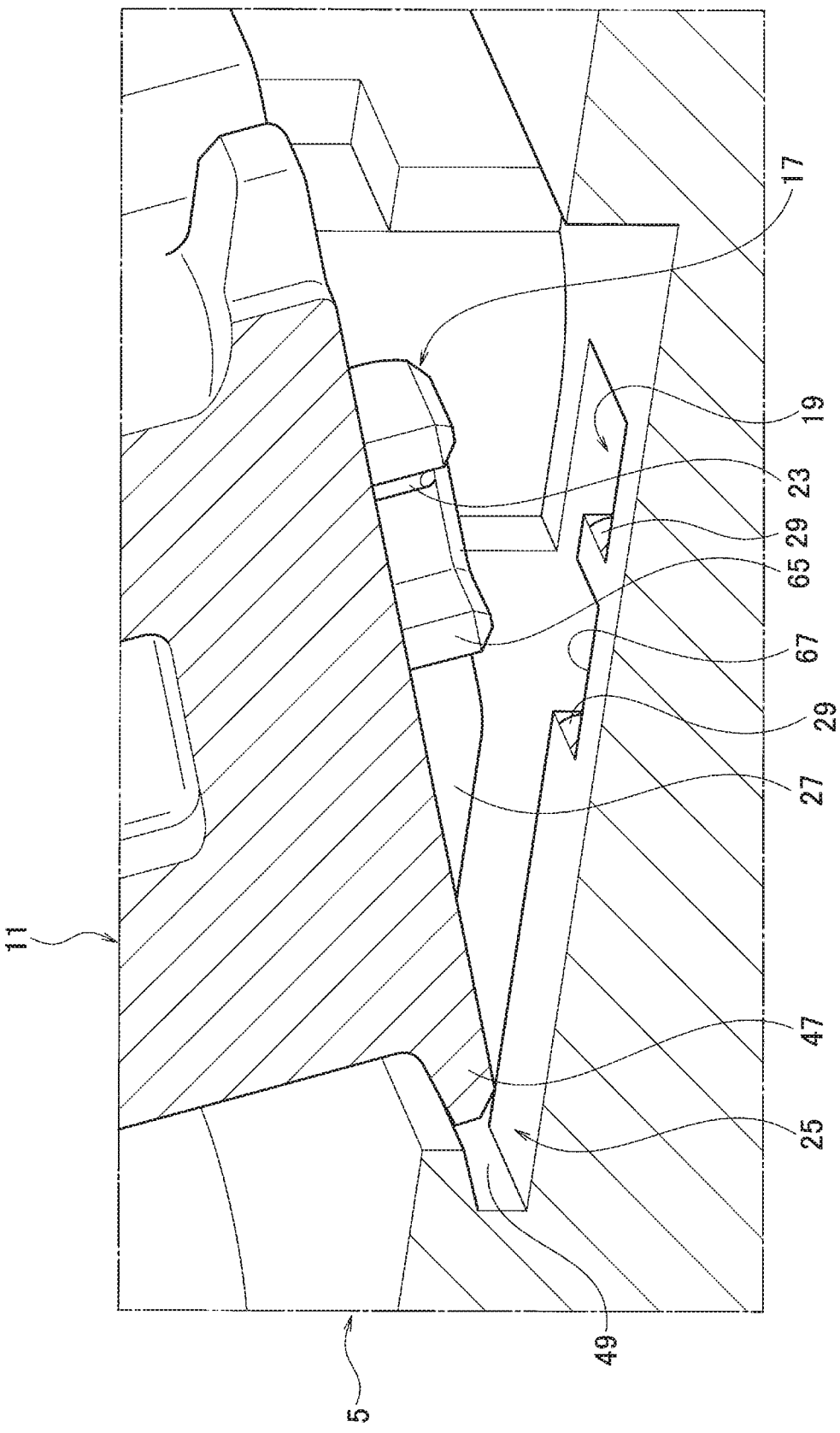
FIG. 10 is an enlarged view of an essential part of FIG. 9.
Figure 11:
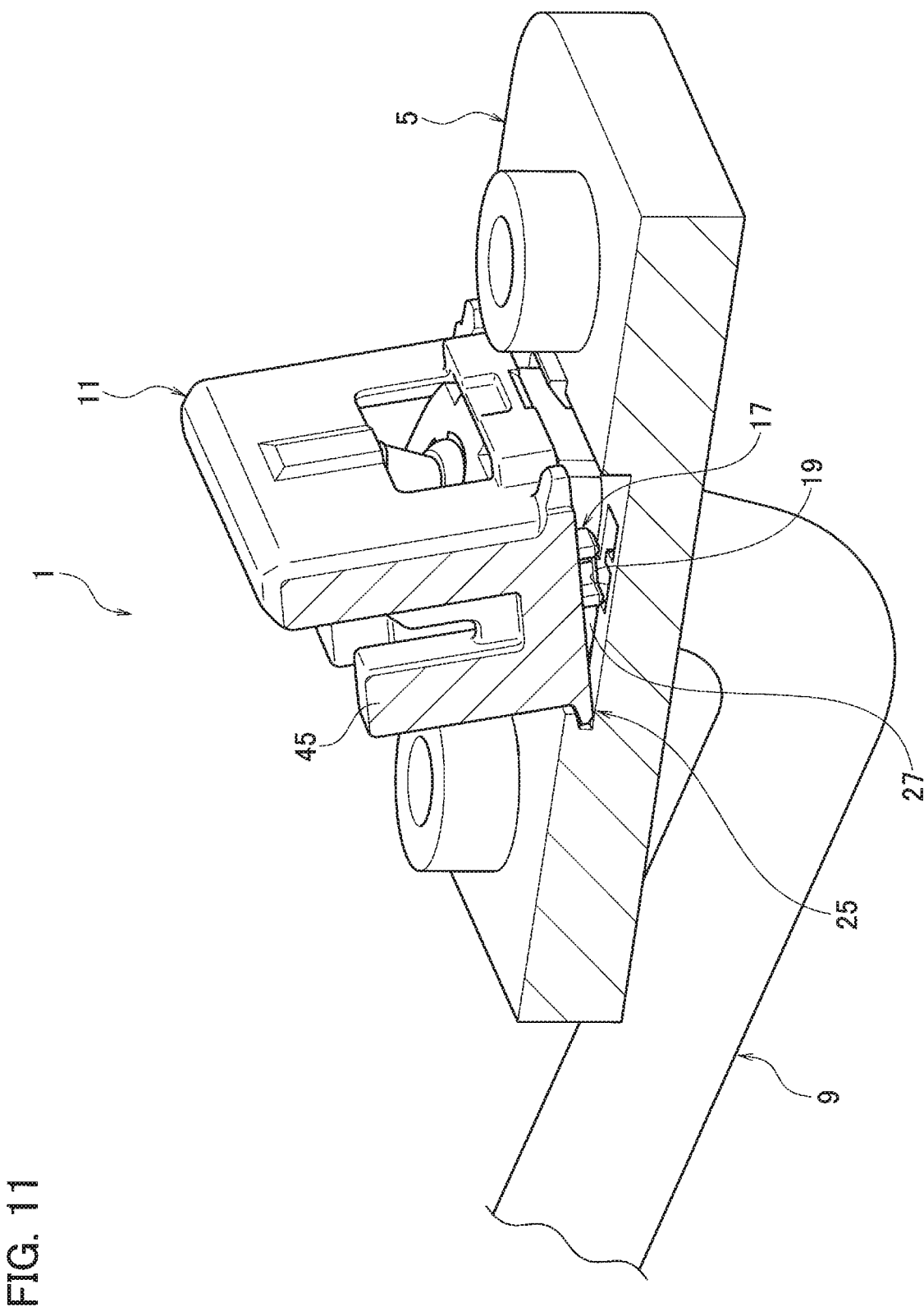
FIG. 11 is a partially cross-sectional perspective view of the sun visor connector according to the embodiment when the housing is assembled to the bracket.
Figure 12:
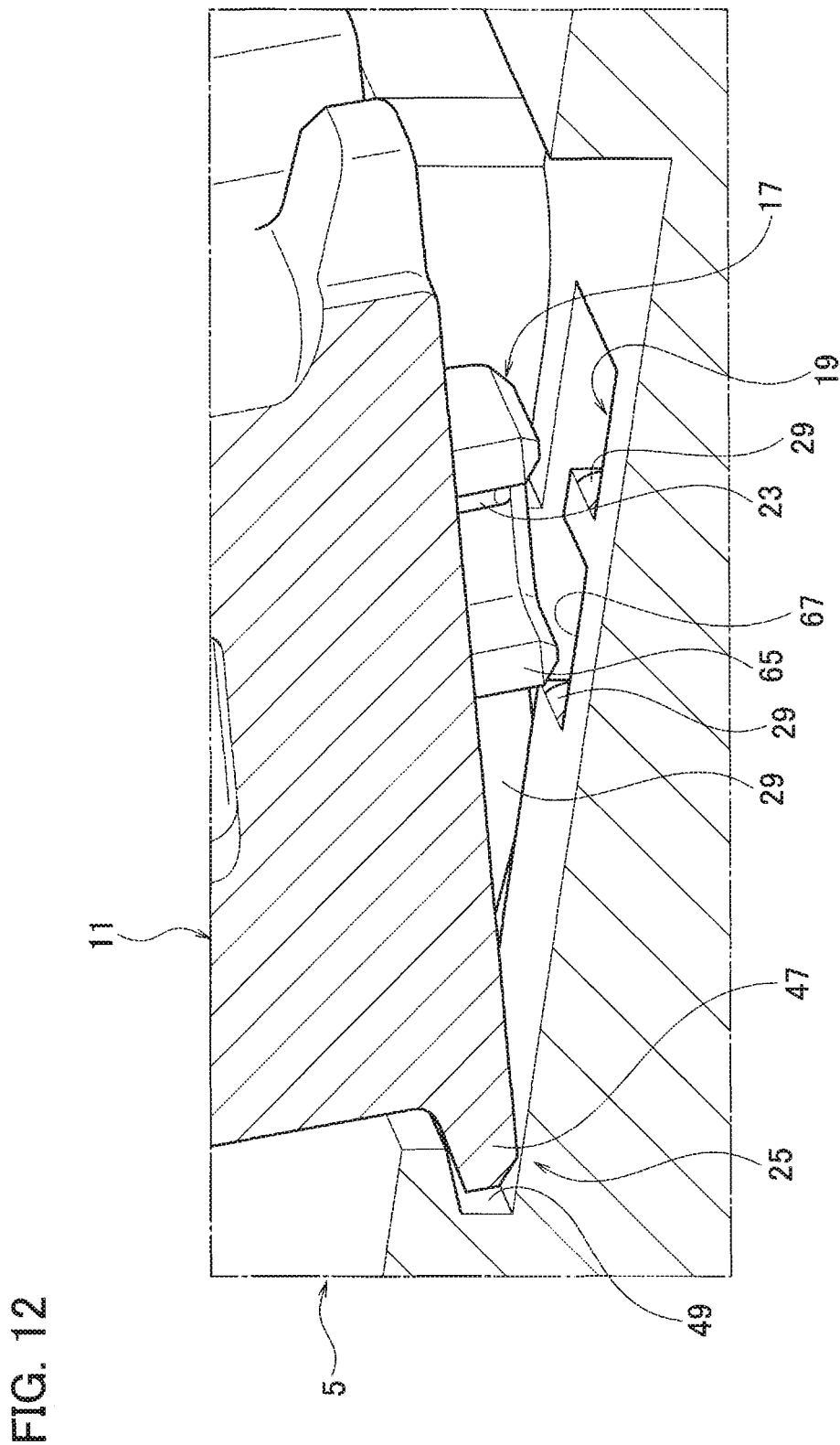
FIG. 12 is an enlarged view of an essential part of FIG. 11.
Figure 13:
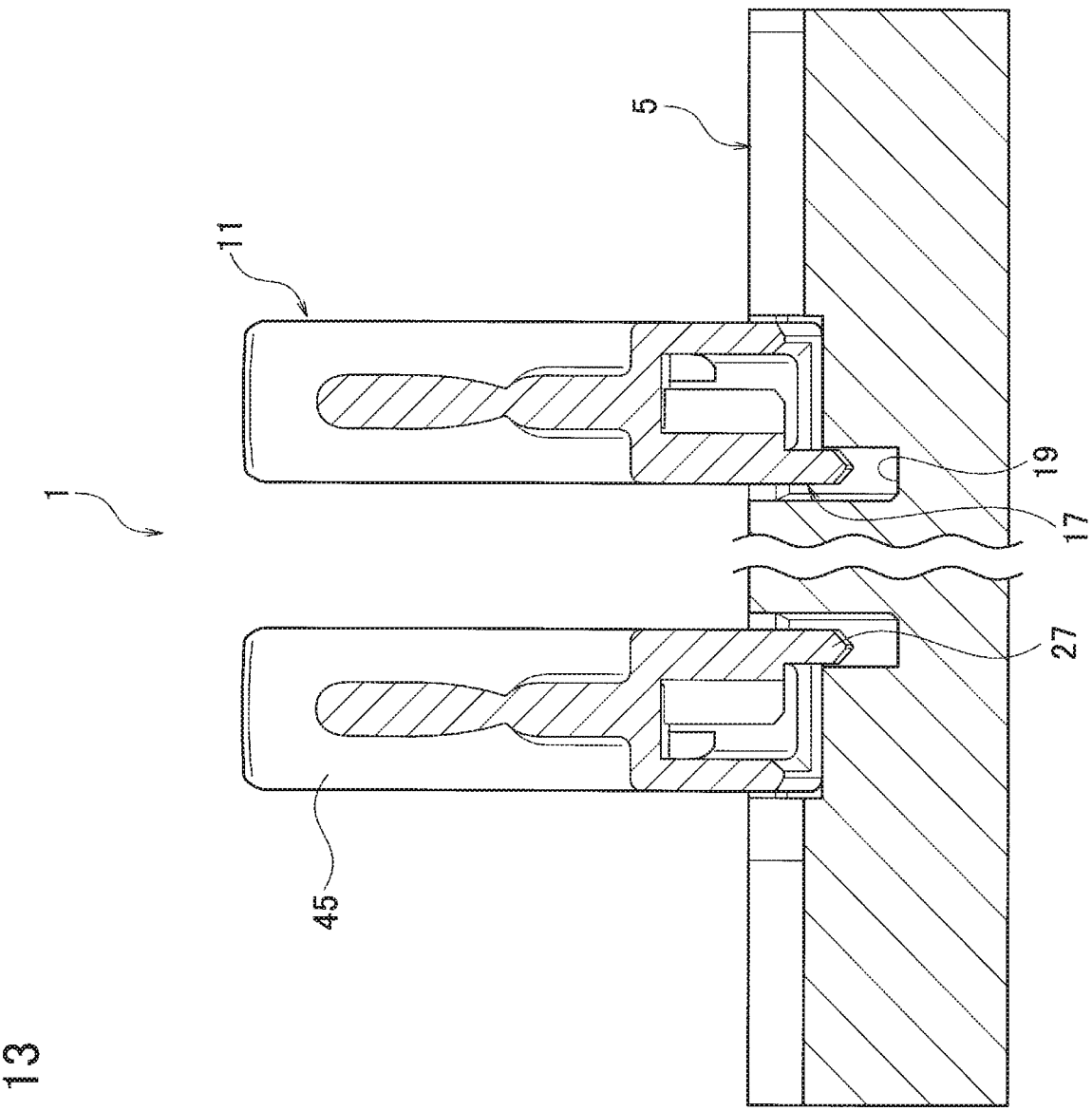
FIG. 13 is a cross-sectional view taken along line Z-Z of FIG. 4.
Figure 14:
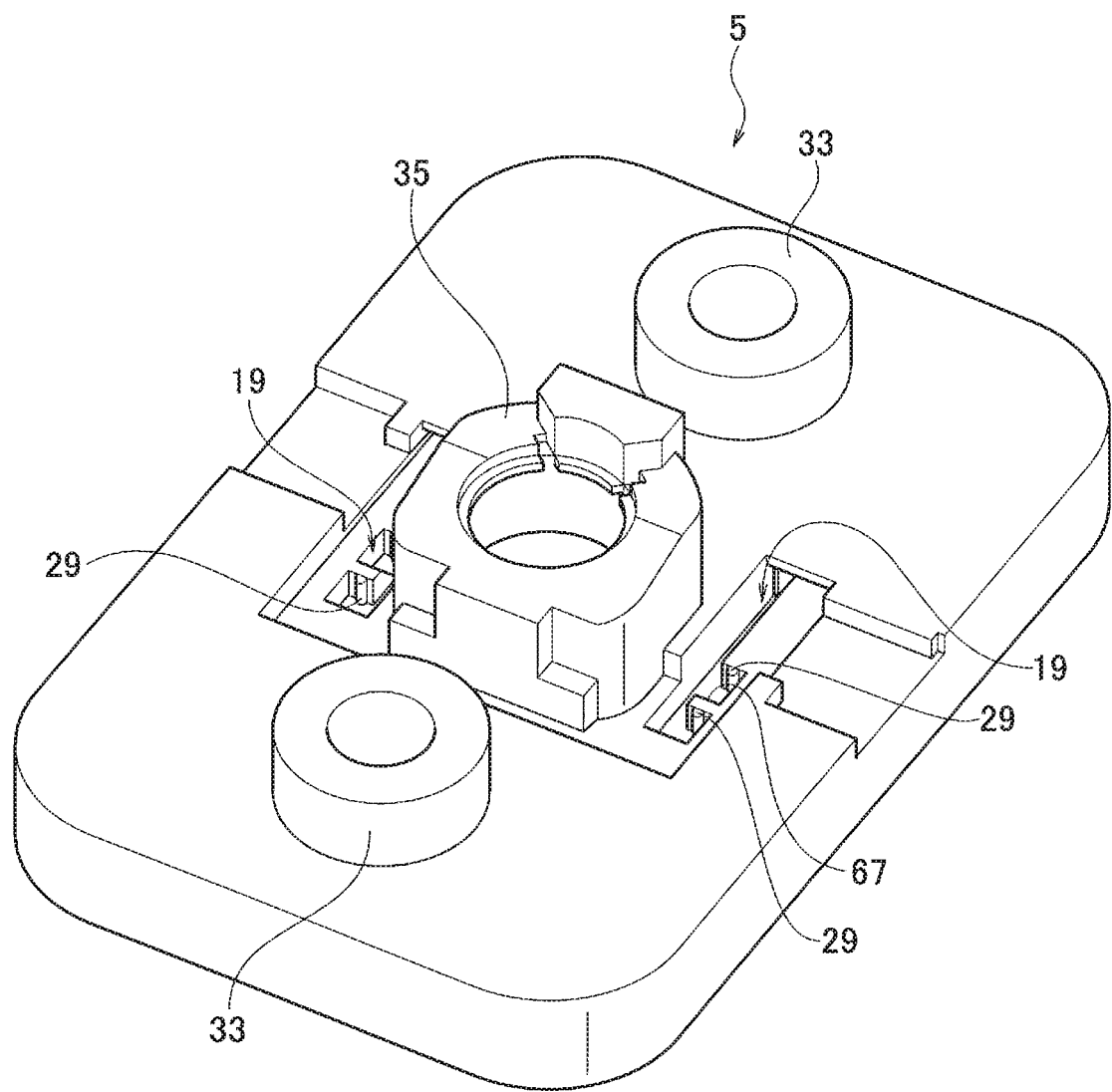
FIG. 14 is a perspective view of the bracket of the sun visor connector according to the embodiment.
Figure 15:
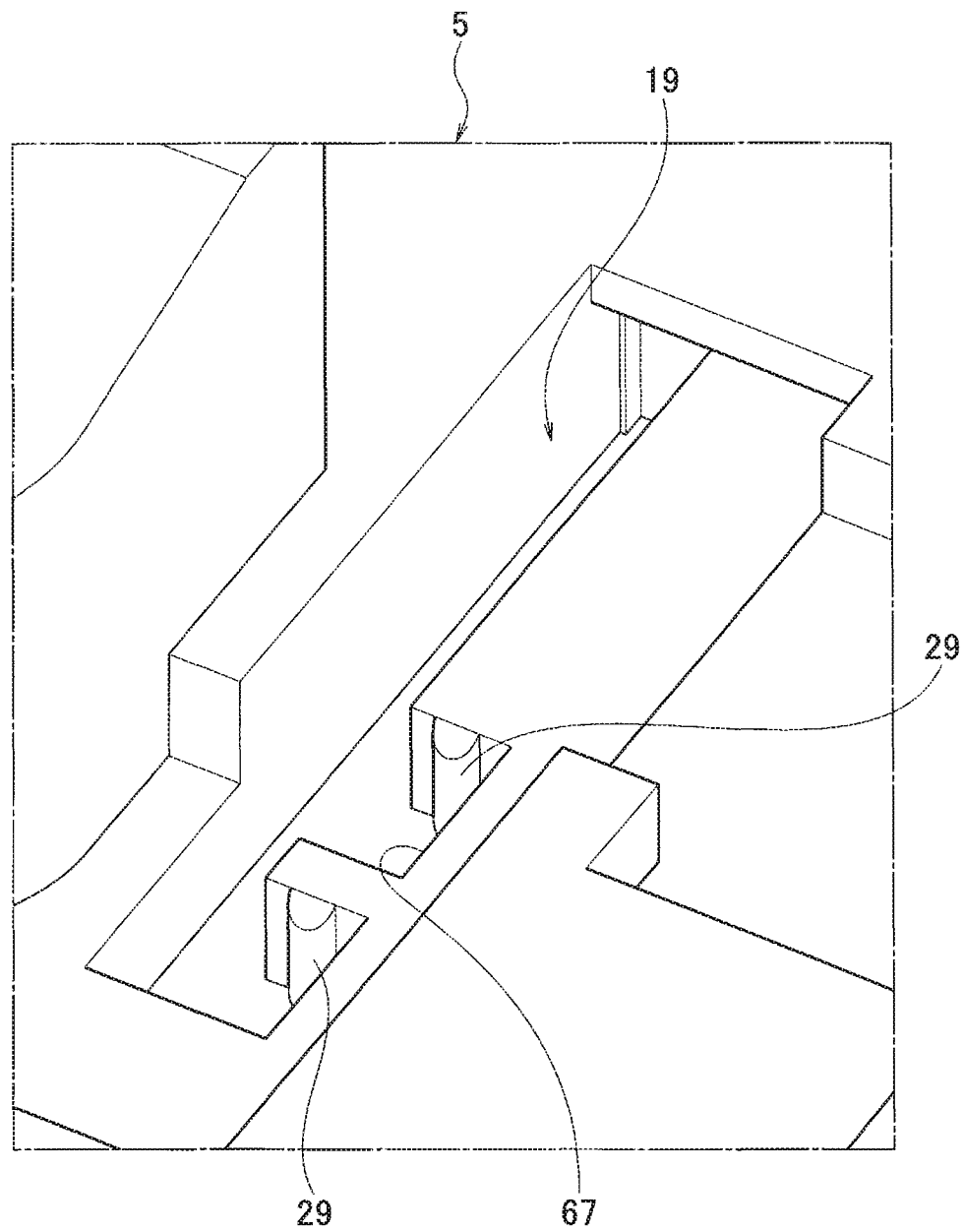
FIG. 15 is an enlarged view of an essential part of FIG. 14.

With the first restricting portion 23 protruding as described above, when the first restricting portion 23 abuts on the inner wall surface of the recessed portion 19, the housing 11 is pressed in the biasing direction (here, to an inner side in the width direction of the bracket 5) of the arm connection part 15 as illustrated by an arrow in FIG. 5.

As the housing 11 is pressed in the biasing direction of the arm connection part 15 by the first restricting portion 23, backlash of the arm connection part 15 is eliminated in a direction in which the contact load with the contact portion 43 of the arm portion 9 increases. In this manner, contact between the contact portion 43 of the arm portion 9 and the arm connection part 15 can be stabilized.

The second restricting portions 29 are ribs that are provided on both side walls of a recessed side frame portion 67 which is provided to protrude in the recessed portion 19 so as to be alternately arranged with the projecting side frame portion 65 of the projecting portion 17, protrude from the side wall of the recessed side frame portion 67 toward the side wall of the projecting side frame portion 65, and is provided to extend in a height direction of the recessed portion 19.

The protruding direction of the second restricting portion 29 is the same as the direction orthogonal to the deformation direction of the arm connection part 15 (here, a length direction of the bracket 5).

The second restricting portion 29 abuts so as to press the side wall of the projecting side frame portion 65 opposed in the protruding direction so as to eliminate the backlash between the projecting portion 17 and the recessed portion 19 in the engaging portion 21 in a direction orthogonal to the deformation direction of the arm connection part 15.

With the second restricting portion 29 eliminating the backlash between the projecting portion 17 and the recessed portion 19 in a direction orthogonal to the deformation direction of the arm connection part 15, the housing 11 has no backlash with respect to the bracket 5 in the direction orthogonal to the deformation direction of the arm connection part 15 (here, the length direction of the bracket 5).

Therefore, the arm connection part 15 of the connector terminal 13 fixed to the housing 11 has no backlash in the direction orthogonal to the deformation direction, and a fluctuation of the contact load on the contact portion 43 of the arm portion 9 is further suppressed, and resistance increase and the like can be further suppressed.

Since the first restricting portion 23 and the second restricting portion 29 which press and abut on the projecting portion 17 and the recessed portion 19 are provided in the projecting portion 17 and the recessed portion 19 in the engaging portion 21, the projecting portion 17 is press-fitted to the recessed portion 19 when the projecting portion 17 is inserted into the recessed portion 19.

For this reason, when an insertion position of the projecting portion 17 into the recessed portion 19 is unstable, it is difficult to insert the projecting portion 17 into the recessed portion 19 and there has been possibility that the assemblability is lowered.

In view of the above, the projecting portion 17 is provided with an insertion guide portion 27 that guides insertion of the projecting portion 17 into the recessed portion 19 when the housing 11 is assembled to the bracket 5.

The insertion guide portion 27 is provided between the fulcrum portion 25 of the projecting portion 17 and the projecting side frame portion 65, and is formed to incline from the fulcrum portion 25 to the projecting side frame portion 65 along a rotation track of the housing 11 when the housing 11 is rotated relative to the bracket 5 with the fulcrum portion 25 as a fulcrum.

The insertion guide portion 27 is inserted into the recessed portion 19 when the housing 11 is rotated relative to the bracket 5 with the fulcrum portion 25 as a fulcrum, and guides rotation of the housing 11 so as to position an arrangement position of the projecting side frame portion 65 with respect to the recessed side frame portion 67.

By providing the insertion guide portion 27 in this manner, the projecting portion 17 can be easily inserted into the recessed portion 19 in accordance with a rotational movement of the housing 11, and assemblability can be improved.

A tapered surface is provided on an opposing surface side of the first restricting portion 23 and the second restricting portion 29 to the bracket 5 and the housing 11, so as to facilitate insertion of the projecting portion 17 into the recessed portion 19.

In the sun visor connector 1 according to the embodiment, the first restricting portion 23 which is pressed against and abuts on the recessed portion 19 in the deformation direction of the arm connection part 15 is provided on the projecting portion 17. Accordingly, in a state where the housing 11 is assembled to the bracket 5, backlash of the housing 11 in the deformation direction of the arm connection part 15 can be prevented.

For this reason, the arm connection part 15 of the connector terminal 13 accommodated in the housing 11 does not come in contact with the end of the arm portion 9 while being fluctuated in the deformation direction due to backlash of the housing 11, and generation of a fluctuation in a contact load between the end of the arm portion 9 and the arm connection part 15 can be prevented.

Therefore, in the sun visor connector 1 according to the embodiment, the connection load between the end of the arm portion 9 and the arm connection part 15 is not fluctuated due to backlash of the housing 11, and connection reliability can be maintained.

As the housing 11 is pressed in the biasing direction of the arm connection part 15 by the first restricting portion 23, the housing 11 does not have backlash in a direction in which the arm connection part 15 is separated from the end of the arm portion 9, and a contact load between the end of the arm portion 9 and the arm connection part 15 can be maintained.

The projecting portion 17 is provided with the insertion guide portion 27 which is inclined along the rotation track of the housing 11 and guides the insertion of the projecting portion 17 into the recessed portion 19. Therefore, when the housing 11 is assembled to the bracket 5, the projecting portion 17 can be smoothly inserted into the recessed portion 19, and the assemblability can be improved.

The recessed portion 19 is provided with the second restricting portion 29 which is pressed against and abuts on the projecting portion 17 in a direction orthogonal to the deformation direction of the arm connection part 15. Therefore, the housing 11 does not have backlash in a direction orthogonal to the deformation direction of the arm connection part 15, and the contact load between the end of the arm portion 9 and the arm connection part 15 can be further maintained.

In the sun visor connector 1 according to the embodiment, the projecting portion 17 is provided in the housing 11 and the recessed portion 19 is provided in the bracket 5. However, the embodiment is not limited to the above configuration, and a projecting portion may be provided in the bracket 5 and a recessed portion may be provided in the housing 11.

The first restricting portion 23 is provided on the projecting portion 17. However, the embodiment is not limited to this configuration, and the first restricting portion may be provided in the recessed portion 19 or the first restricting portion may be provided in the projecting portion 17 and the recessed portion 19.

The second restricting portion 29 is provided in the recessed portion 19. However, the embodiment is not limited to this configuration, and the second restricting portion may be provided in the projecting portion 17 or the second restricting portion may be provided in the projecting portion 17 and the recessed portion 19.

The first restricting portion 23 and the second restricting portion 29 are ribs provided in the projecting portion 17 and the recessed portion 19. However, the embodiment is not limited to this configuration, and the first restricting portion 23 and the second restricting portion 29 may be a protrusion protruding in a hemispherical shape, and may have any shape as long as they can press and abut on the projecting portion 17 and the recessed portion 19.

What is claimed is:

1. A sun visor connector, comprising:
    a bracket attached to an attachment member;

an arm portion arranged on a side of one surface of the attachment member of the bracket, configured to rotatably support a sun visor main body, and having an end inserted through the bracket to be rotatably arranged;

a housing fixed to a side of another surface of the attachment member of the bracket and arranged in a vicinity of the end of the arm portion inserted through the bracket;

a connector terminal accommodated in the housing and connected to a counterpart terminal arranged on the other surface of the attachment member;

an arm connection part provided in an elastically deformable manner on the connector terminal and connected to the end of the arm portion by a biasing force;

an engaging portion including a projecting portion provided in either one of the bracket and the housing, and a recessed portion provided in the other one of the bracket and the housing and engaged with the projecting portion; and a first restricting portion provided in either one of the projecting portion and the recessed portion, and pressed against and abuts on the other one of the projecting portion and the recessed portion in a deformation direction of the arm connection part.

2. The sun visor connector of claim 1, wherein
the first restricting portion presses the housing in a biasing direction of the arm connection part.

3. The sun visor connector of claim 1, wherein
a fulcrum portion serving as a fulcrum when the housing is rotated and assembled to the bracket is provided between the bracket and the housing, and
the projecting portion is provided with an insertion guide portion which is inclined along a rotation track of the housing and guides insertion of the projecting portion into the recessed portion.

4. The sun visor connector of claim 1, wherein
either one of the projecting portion and the recessed portion is provided with a second restricting portion that is pressed against and abuts on the other one of the projecting portion and the recessed portion in a direction orthogonal to a deformation direction of the arm connection part.

* * * * *